(12) United States Patent
Aitken et al.

(10) Patent No.: US 7,189,672 B2
(45) Date of Patent: Mar. 13, 2007

(54) ALUMINUM SILICOPHOSPHATE GLASSES

(75) Inventors: Bruce G. Aitken, Corning, NY (US);
George H. Beall, Big Flats, NY (US);
Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 58 days.

(21) Appl. No.: 11/026,364

(22) Filed: Dec. 30, 2004

(65) Prior Publication Data
US 2005/0170199 A1   Aug. 4, 2005

Related U.S. Application Data

(60) Provisional application No. 60/533,784, filed on Dec. 31, 2003.

(51) Int. Cl.
*C03C 3/062* (2006.01)
*C03C 3/064* (2006.01)
*C03C 3/097* (2006.01)

(52) U.S. Cl. ............... 501/63; 501/73; 501/77
(58) Field of Classification Search ........... 501/63, 501/73, 77–79
See application file for complete search history.

(56) References Cited

U.S. PATENT DOCUMENTS

| | | | | |
|---|---|---|---|---|
| 2,359,789 A | * | 10/1944 | Pincus | 501/73 |
| 3,236,662 A | | 2/1966 | MacDowell | 106/39 |
| 3,682,609 A | | 8/1972 | Dockerty | 65/83 |
| 4,213,789 A | | 7/1980 | Bartha et al. | 106/52 |
| 4,634,683 A | | 1/1987 | Dumbaugh | 501/32 |
| 4,634,684 A | | 1/1987 | Dumbaugh | 501/69 |
| 4,820,662 A | * | 4/1989 | Izumitani et al. | 501/73 |
| 5,227,343 A | * | 7/1993 | Osuka et al. | 501/77 |
| 5,326,730 A | | 7/1994 | Dumbaugh et al. | 501/69 |
| 5,374,595 A | | 12/1994 | Dumbaugh et al. | 501/66 |
| 5,607,886 A | * | 3/1997 | Onozawa | 501/73 |
| 5,968,857 A | | 10/1999 | Pinckney | 501/10 |
| 6,248,678 B1 | | 6/2001 | Pinckney | 501/10 |
| 6,319,867 B1 | | 11/2001 | Chacon et al. | 501/66 |
| 6,555,232 B1 | | 4/2003 | Aitken et al. | 428/428 |

FOREIGN PATENT DOCUMENTS

| | | | |
|---|---|---|---|
| GB | 576205 | | 3/1946 |
| JP | 2001199737 | * | 7/2001 |
| RU | 547403 | | 7/1977 |

OTHER PUBLICATIONS

D.J. DiGiovanni et al., "Structure And Properties Of Silica Containing Aluminum And Phosphorus Near the AlPO$_4$ Join", Journal of Non-Crystalline Solids, vol. 113, 1989, pp. 58-64.
J.F. MacDowell et al., "Immiscibility and Crystallization in Al$_2$O$_3$-SiO$_2$ Glasses", Journal of The American Ceramic Society, vol. 52, No. 1, pp. 17-25.
R.M. Klein et al., "Glass Formation and Properties in the Aluminum Borophosphate System", Ceramic Bulletin, vol. 57, No. 2, pp. 199-216.
O.V. Mazurin et al., "Handbook of Glass Data, Part C, Ternary Silicate Glasses", pp. 957 and 960.

* cited by examiner

*Primary Examiner*—Karl Group
(74) *Attorney, Agent, or Firm*—Thomas R. Beall; Tina N. Thompson

(57) ABSTRACT

A substrate for flat panel display glasses comprising a glass the P$_2$O$_5$—SiO$_2$—Al$_2$O$_3$ ternary system which yields stable glasses exhibiting high strain point temperatures, resistance to devitrification, good chemical durability, excellent dielectric properties, coefficients of thermal expansion that can be tailored to match that of silicon, and having liquidus viscosities that enable forming by conventional methods. The glass comprises the following composition as calculated in weight percent on an oxide basis: P$_2$O$_5$ 33–75%, SiO$_2$ 2–52%, Al$_2$O$_3$ 8–35%.

10 Claims, 6 Drawing Sheets

ALUMINUM SILICOPHOSPHATE GLASSES

RELATED APPLICATION

This application claims the benefit of priority from Provisional U.S. Patent Application No. 60/533,784, filed, Dec. 31, 2003, the content of which is incorporated herein by reference.

FIELD OF THE INVENTION

The invention relates to $Al_2O_3$—$P_2O_5$—$SiO_2$ glasses that are characterized by a high strain point, a coefficient of thermal expansion that can be matched to silicon, and exhibiting high viscosities at their liquidus temperatures, rendering them especially suitable for use as substrates in flat panel display devices.

BACKGROUND OF THE INVENTION

Liquid crystal displays (LCDs) are passive displays which depend upon external sources of light for illumination. Most commonly, LCDs are manufactured in an active matrix addressed format in which an array of diodes, metal-insulator-metal (MIM) devices, or thin film transistors (TFTs) supplies an electronic switch to each pixel. Two sheets of glass form the structure of the display. The separation of the sheets is the critical gap dimension of 5–10 um that contains the liquid crystal material. In order to maintain uniformity of the gap dimension, extremely precise flatness of the glass sheet is required.

Active matrix liquid crystal displays (AMLCDs) employ an active device such as a diode or thin film transistor at each pixel thereby enabling high contrast and high response speed. Although many display devices currently utilize amorphous silicon (a-Si), the processing of which may be accomplished at temperatures under 450° C., polycrystalline-silicon (poly-Si) processing is preferred. Poly-Si has a much higher drive current and electron mobility thereby increasing the response time of the pixels. Further, it is possible, using poly-Si processing, to build the display drive circuitry directly on the glass substrate. By contrast, a-Si requires discrete driver chips that must be attached to the display periphery utilizing integrated circuit packaging techniques. Poly-Si processing methods operate at higher temperatures than those employed with a-Si TFTs. Such processes enable formation of poly-Si films having extremely high electron mobility (for rapid switching) and excellent TFT uniformity across large areas. The actual temperature required is mandated by the particular process utilized in fabricating the TFTs. Those TFTs with deposited gate dielectrics require 600–650° C., while those with thermal oxides require about 800° C. Both a-Si and poly-Si processes demand precise alignment of successive photolithographic patterns, thereby necessitating that the thermal shrinkage of the substrate be kept low.

The temperature requirements have mandated the use of glasses exhibiting high strain points in order to avoid thermal deformation at temperatures above 600° C.

It is generally accepted that four properties are deemed mandatory for a glass to exhibit in order to fully satisfy the needs of a substrate for LCDs:

First, the glass must be essentially free of intentionally added alkali metal oxide to avoid the possibility that alkali metal from the substrate can migrate into the transistor matrix;

Second, the glass substrate must be sufficiently chemically durable to withstand the reagents used in the TFT deposition process;

Third, the expansion mismatch between the glass and the silicon present in the TFT array must be maintained at a relatively low level even as processing temperatures for the substrates increase; and, Fourth, the glass must be capable of being produced in high quality thin sheet form at low cost; that is, it must not require extensive grinding and polishing to secure the necessary surface finish.

The last requirement is a particularly difficult one to achieve inasmuch as it demands a sheet glass production process capable of producing essentially finished glass sheet, such as the overflow downdraw sheet manufacturing process described in U.S. Pat. No. 3,682,609. That process requires a glass exhibiting a very high viscosity at the liquidus temperature plus long term stability, e.g. periods of 30 days, against devitrification at melting and forming temperatures.

Most glasses to date that fulfill the requirements set forth above are based on eutectic compositions in the alkaline earth boroaluminosilicate systems. The present invention explores a compositional area whose benefits for use as a substrate for display devices will be made evident.

SUMMARY OF THE INVENTION

The present invention describes a glass-forming area in the $P_2O_5$—$SiO_2$—$Al_2O_3$ system which yields stable glasses with high use temperatures, resistance to devitrification, good chemical durability, excellent dielectric properties, coefficients of thermal expansion that can be tailored to match that of silicon, and having liquidus viscosities that enable forming by conventional methods. The glass comprises the following composition as calculated in weight percent on an oxide basis: $P_2O_5$ 33–75%, $SiO_2$ 2–52%, $Al_2O_3$ 8–35%, with the stipulation that the P/Al atomic ratio should lie between 1.3 and 4.0.

DETAILED DESCRIPTION OF THE INVENTION

Very few ternary glass-forming systems have not already been thoroughly evaluated. Moreover, few compositional systems that contain no alkali or alkaline earth cations are known to provide stable, non-devitrifying glasses of excellent quality.

Figure 1:
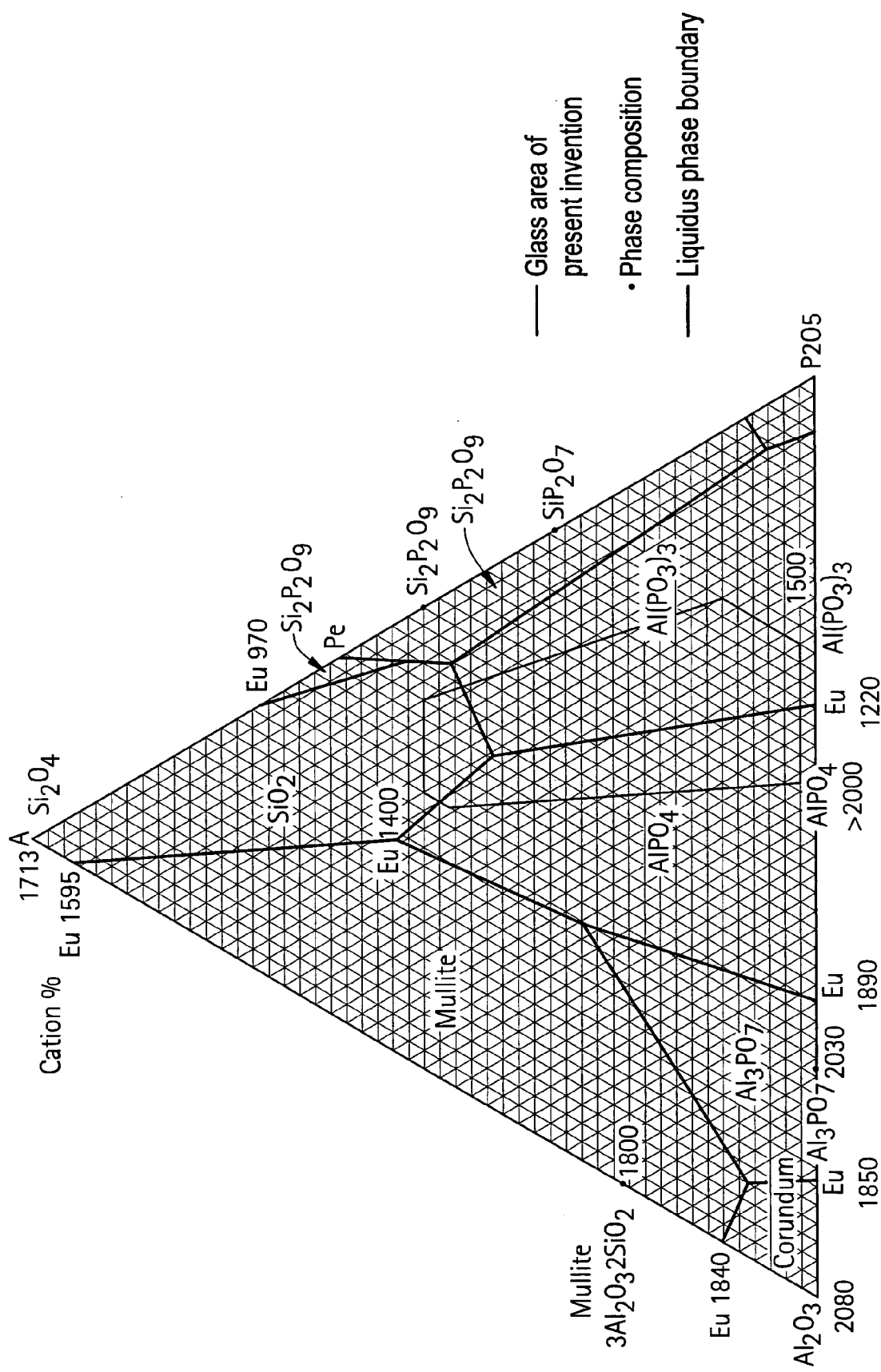
FIG. 1 describes interpolated liquidus phase relations (dark solid lines) in the $SiO_2$—$Al_2O_3$—$P_2O_5$ system from binary data along the $SiO_2$—$P_2O_5$, $SiO_2$—$Al_2O_3$—$Al_2O_3$—$P_2O_5$ and $AlPO_4$—$SiO_2$ joins as given in Phase Diagrams for Ceramists (American Ceramic Society). Cation per cent is used because $Si_2O_4$ and $AlPO_4$ are isostructural. The glass-forming area we claim is outlined in a polygon; the dots indicate good glasses.

A novel glass-forming area has been discovered in the basic system $P_2O_5$—$SiO_2$—$Al_2O_3$. While attempting to synthesize the crystalline compound $Si_2AlO(PO_4)_3$ through melting, an excellent glass was formed, to the surprise of the inventors. The glass-forming area was expanded along the join $Al(PO_3)_3$—$SiO_2$ and on the $Al_2O_3$-rich (peraluminous) side of this join by further melt exploration (see FIG. 1). Glasses poorer in $Al_2O_3$ from this join (subaluminous) were deemed problematic from the standpoint of chemical durability.

An important feature of these glasses is their thermal stability, specifically their resistance to phase separation, devitrification, and deformation at temperatures of 800° C. or even 900° C. The coefficient of thermal expansion ranges from roughly 25 to 55×10-7/° C. and can be tailored to match that of silicon. No alkali or alkaline earth cations are present in these glasses, allowing excellent dielectric behavior. In addition, low liquidus values are expected along cotectic boundaries between $SiO_2$, $AlPO_4$, and $Al(PO_3)_3$ phases in the preferred composition areas. The peraluminous glasses described herein have shown excellent resistance to boiling water.

These properties were recognized as being potentially and particularly important for relatively refractory, low-density substrates for silicon or other substrates where the absence of alkali and related glass modifiers is demanded (such as low dielectric substrates). There is a need for readily-meltable glasses which resist deformation and devitrification at high temperatures, have no mobile cations, and possess a useful range of thermal expansion coefficients.

The advantages of these glasses involve their superior deformation resistance over conventional glasses. They can be heated to 800° C. or even 900° C. without noticeable deformation. Annealing points of many compositions exceed 750° C. Expansion of the glasses range from 25 to 55×10-7/° C. and can be tailored to match that of silicon. The glasses contain no alkali or alkaline earth metals and can be made from relatively inexpensive batch materials. Many of these glasses possess low liquidus temperatures and are compatible with a wide range of forming processes.

The ternary glass composition area-defined herein in weight % is as follows:

| | |
|---|---|
| $SiO_2$ | 2–52 |
| $Al_2O_3$ | 8–35 |
| $P_2O_5$ | 33–75, |
| | where 1.3 < P/Al < 4.0. |

It has also been found that boric oxide, $B_2O_3$, additions are effective in stiffening glasses that otherwise might deform above 800° C. In addition, $B_2O_3$ is expected to lower the liquidus temperature and further stabilize the glasses against devitrification. The level of $B_2O_3$ added to the ternary compositions is typically up to 10% by weight. With this component added, the broader quaternary glass compositions are as follows:

| | |
|---|---|
| $SiO_2$ | 2–52 |
| $Al_2O_3$ | 8–35 |
| $P_2O_5$ | 30–75 |
| $B_2O_3$ | 0–10, |
| | where 1.3 < P/Al < 4.0. |

It is believed that $B_2O_3$ additions help to immobilize $P_2O_5$ in the glass structure as $BPO_4$ units, thereby increasing stiffness and improving chemical durability. Other oxides such as $ZrO_2$ can be added in amounts up to 6% where appropriate. These glasses can also be doped with transition element or rare earth cations to yield potentially useful optical properties.

Figure 5:
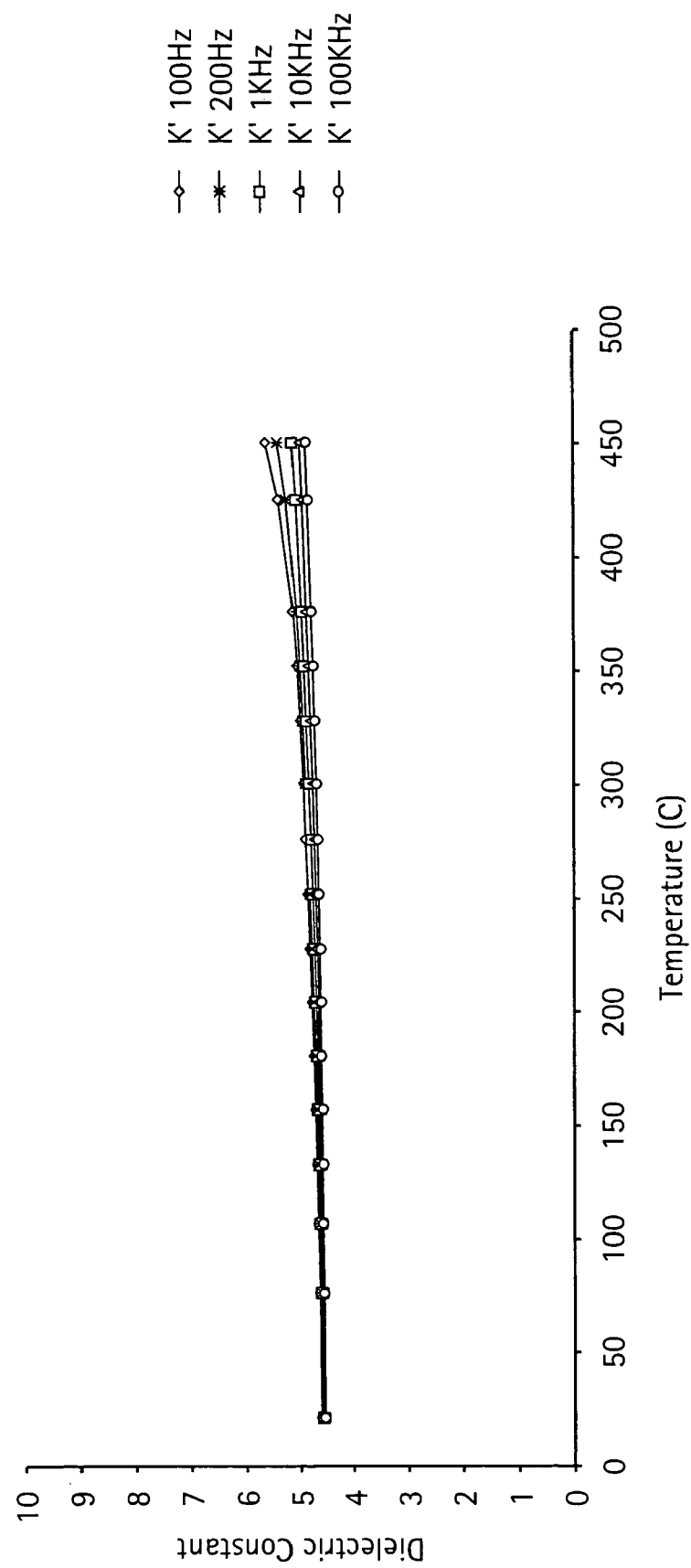
FIG. 5 is a dielectric constant curve plotting dielectric constant v. temperature for a representative glass composition.

As noted, glasses in the composition region have excellent dielectric properties with dielectric constants as low as 4.5 (and usually flat with respect to temperature and KHz) and resistivities at 250° C. of $10^{14}$–$10^{16.5}$. The dielectric constant curves for a representative glass (908 ZCP) are shown in FIG. 5.

The glasses of the present invention were melted in platinum crucibles at temperatures of 1600–1650° C. (although lower temperatures could be used for many of these glasses), cast into patties, and annealed at 750° C. Typical $P_2O_5$ loss is about 1%. Descriptions of the glasses as melted and as subsequently heat-treated are described in Table 1. Physical properties obtained to date are also listed in the table.

Figure 2:
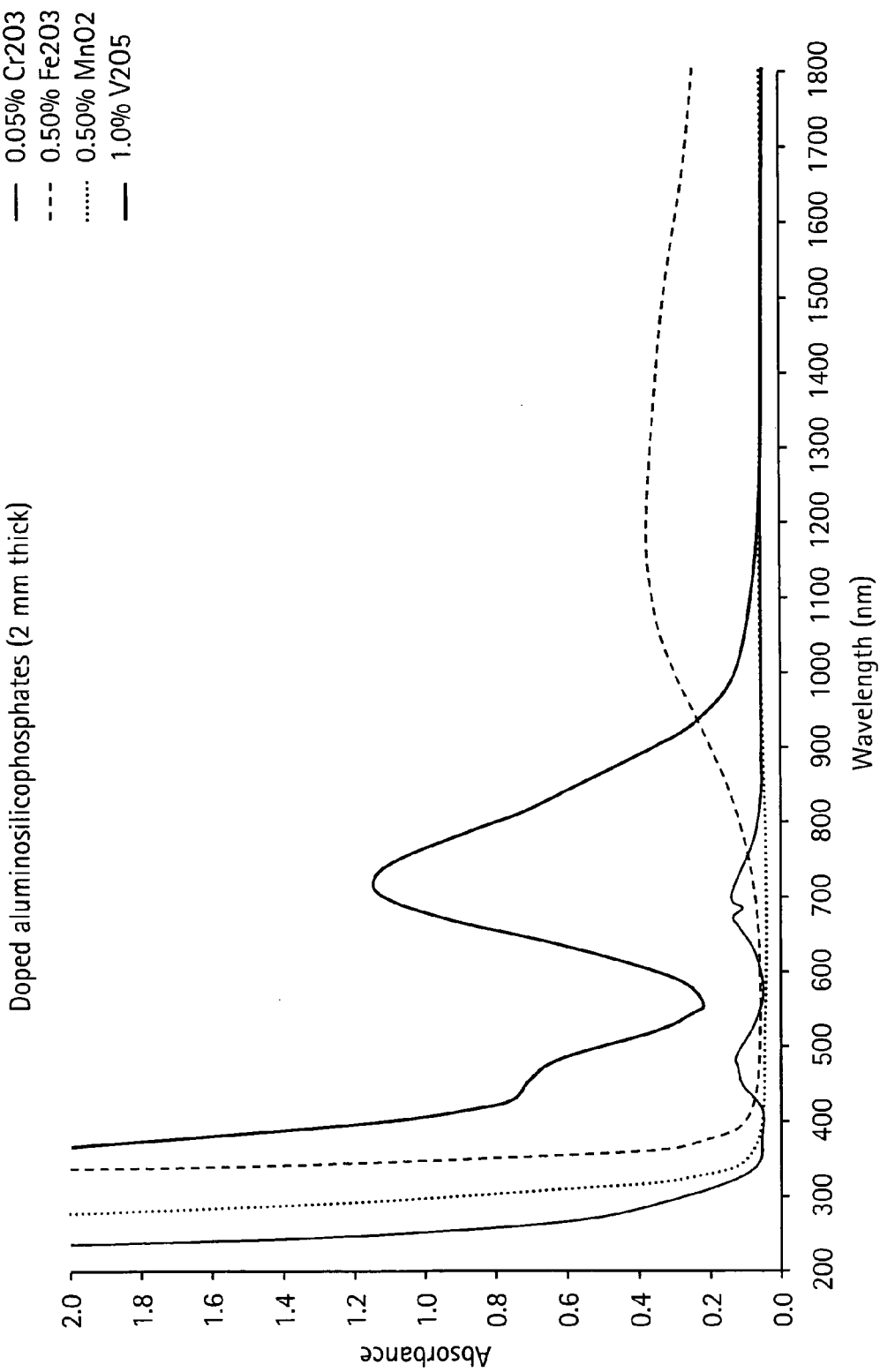
FIG. 2 shows absorbance curves of Cr—, V—, Fe—, and Mn-doped glasses (base composition=YVF from Table 1).

FIG. 2 shows the absorbance curves for a typical aluminosilicophosphate glass (908 YVF in Table 1) doped with various ions. The glass appears to provide a mildly reducing environment, with the iron occurring predominantly as $Fe^{2+}$ and chromium as $Cr^{3+}$ (and no $Cr^{6+}$, as evidenced by the UV edge.) The 650 nm absorption of $Cr^{3+}$ also is red-shifted, suggesting a weaker crystal field than obtained in conventional soda lime or aluminosilicate glasses.

Figure 3:
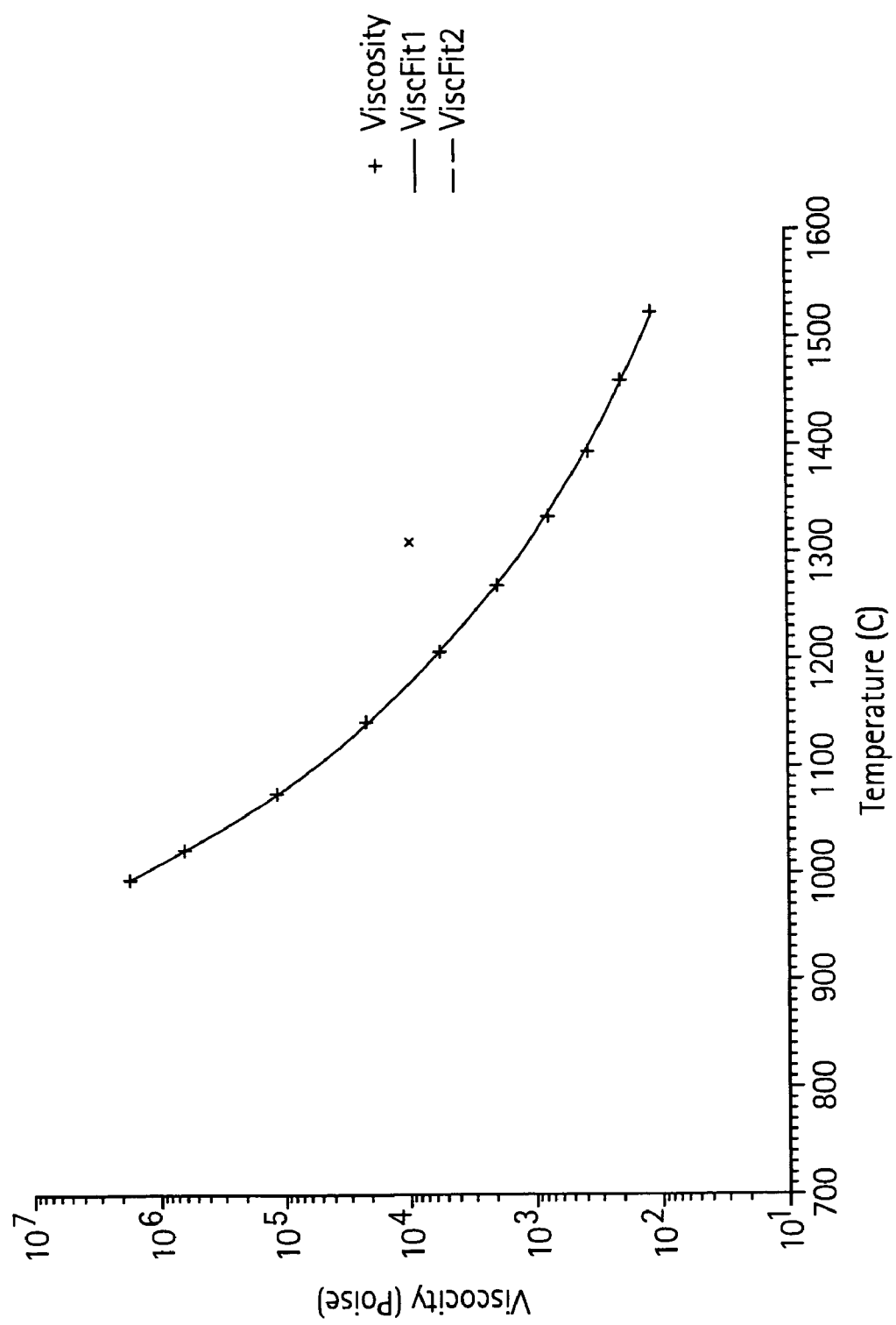
FIG. 3 is a plot of viscosity over a range of temperatures for an exemplary composition.

FIG. 3 shows a viscosity curve for exemplary composition 908ZCA. As one of skill in the art can appreciate, the composition has a very high viscosity at the liquidus, in excess of 1,000,000 poises. This makes it an excellent candidate for downdraw manufacturing processes (e.g. the fusion or slot draw process). The preferred manufacturing process for the glasses of the present invention is via a downdraw sheet manufacturing process (e.g. the fusion or slot draw process) in which glass sheets are formed while traveling in a downward direction. In the fusion or overflow downdraw forming process, molten glass flows into a trough, then overflows and runs down both sides of a pipe, fusing together at what is called the root, (when the pipe ends and the two overflow portions of glass rejoin) and is drawn downward until cool. The overflow downdraw sheet manufacturing process is described for example in U.S. Pat. No. 3,338,696 and U.S. Pat. No. 3,682,609.

Figure 6:
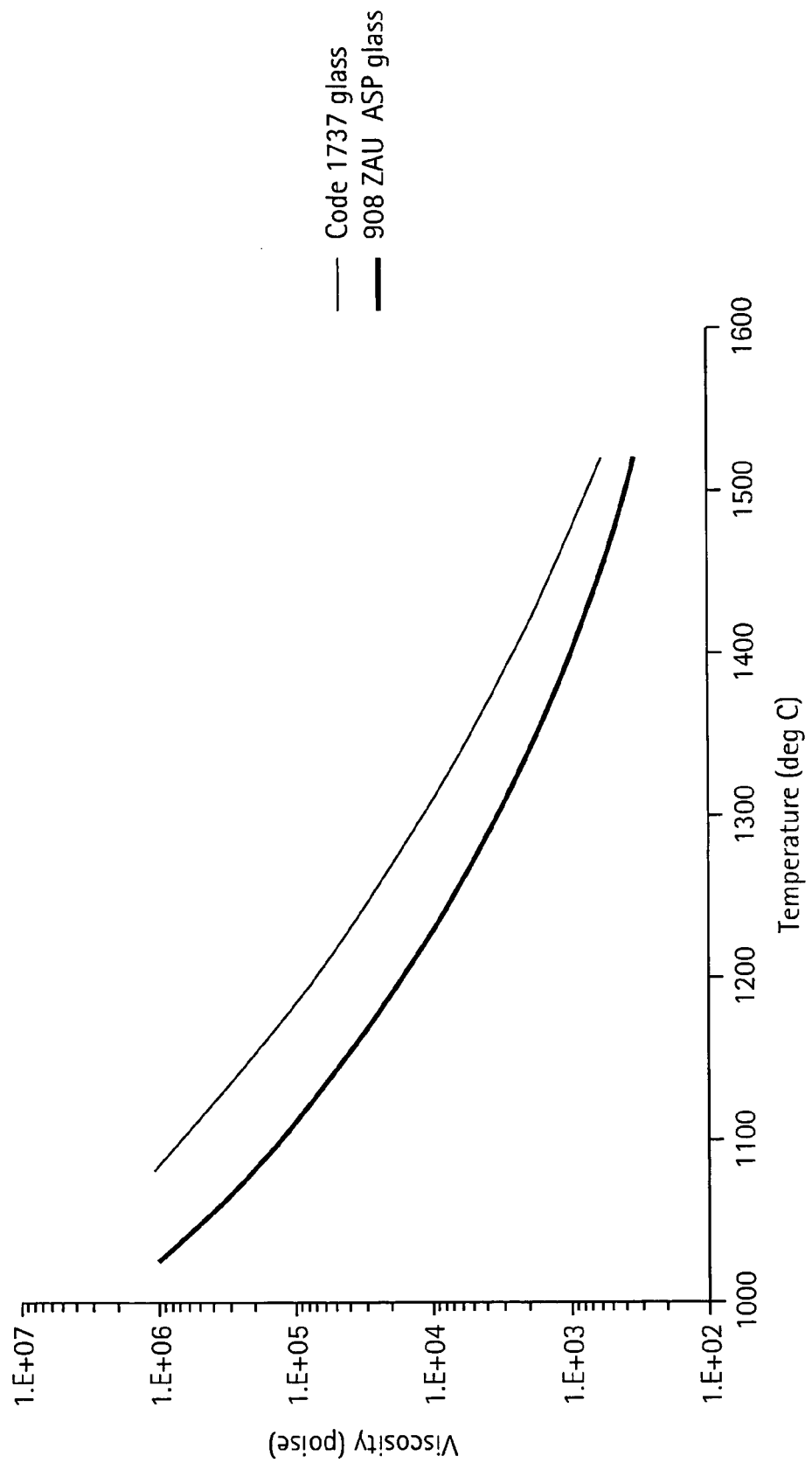
FIG. 6 is a plot of viscosity over a range of temperatures comparing an exemplary composition of the present invention and a commercially available glass made utilizing a downdraw process.

FIG. 6 shows a viscosity curve for another exemplary composition (908 ZAU). The viscosity at the liquidus for this composition is greater than 10,000,000 poise. These low liquidus glasses can be melted as low as 1400–1450° C., significantly minimizing phosphorous volatility during melting. For comparative purposes, a viscosity curve for a commercially produced glass, manufactured by the fusion process, (Corning Incorporated Code 1737) is included in FIG. 6.

TABLE 1

Glass Compositions and Properties

| wt % (batched) 908 | ZCA | YVF | YVY | YWQ | YWW | YXA | ZAU | ZCD | ZCK |
|---|---|---|---|---|---|---|---|---|---|
| $SiO_2$ | 21.4 | 31.3 | 30.1 | 38.8 | 47.5 | 39.8 | 27.4 | 41.5 | 39.8 |
| $Al_2O_3$ | 13.1 | 13.3 | 12.8 | 16.9 | 10.7 | 17.3 | 13.1 | 16.4 | 30.4 |
| $P_2O_5$ | 54.7 | 55.4 | 53.3 | 44.3 | 39.3 | 40.3 | 54.7 | 12.1 | 49.9 |
| $B_2O_3$ | 4.8 | 0 | 0 | 0 | 2.5 | 2.6 | 4.8 | 0 | 0 |
| $ZrO_2$ | 0 | 0 | 3.8 | 0 | 0 | 0 | 0 | 0 | 0 |
| Glass appearance | | clear | clear | Clear | clear | clear, seedy | clear | clear | clear |
| Heat treatments | | | | | | | | | |
| 900° C.-4 h | | some slump | | some haze no slump | some haze no slump | | clear sl. slump | some haze clear | sl haze sl slump |
| 850° C.-4 h | | clear | | | | | clear | | clear |
| Liquidus T ° C. | 875 | 1110 | | | >1250 | | | | |
| Refractive index | | 1.499 | | | | | | | 1.485 |
| Density g/cm³ | 2.486 | 2.485 | | | | | 2.486 | | 2.374 |
| CTE 25–500° C. (×10⁻⁷/° C.) | 48 | 47 | | 32 | | | 53 | | 37 |
| Anneal point (° C.) | 729 | 728 | | 713 | | | | | |
| Strain point (° C.) | 681 | 677 | | 660 | | | | | |
| 2 h boiling water | good | good | | good | | | good | | irid. |

| wt % (batched) 908 | ZCP | ZCS | ZCX | ZDA | ZEY | ZFA | ZFC | ZFV | ZFW |
|---|---|---|---|---|---|---|---|---|---|
| $SiO_2$ | 39.5 | 31.2 | 25.8 | 24.4 | 16.9 | 19.7 | 16.1 | 12.4 | 13.3 |
| $Al_2O_3$ | 15.6 | 19.5 | 21.1 | 17.6 | 20.8 | 18.3 | 19.8 | 22.4 | 24.1 |
| $P_2O_5$ | 40.1 | 44.5 | 53.1 | 53.2 | 62.3 | 57.2 | 59.3 | 58.2 | 62.6 |
| $B_2O_3$ | 4.8 | 4.8 | 0 | 4.8 | 0 | 4.8 | 4.8 | 7 | 0 |
| Glass appearance | Clear | clear | clear | clear | clear | clear | clear | | |
| Heat treatments | | | | | | | | | |
| 900° C.-4 h | Clear no slump | clear no slump | some haze slump | Clear sl. slump | clear slump | clear some slump | clear some slump | | |
| 850° C.-4 h | | | clear. no slump | Clear sl slump | | | | | |
| Liquidus T ° C. | | | | | | | | | |
| Refractive index | | | 1.491 | | | | | | |
| Density g/cm³ | 2.313 | | | 2.413 | | | | | |
| CTE 25–500° C. (×10⁻⁷/° C.) | | | | | | | | | |
| Anneal point (° C.) | | | | | | | | | |
| Strain point (° C.) | | | | | | | | | |
| 2 h boiling water | rough surf | | | | very good | rough surf | excellent | | |

An additional series of melting experiments were conducted at 1600–1650° C. for 4 hours on 500–1000 gm batches of the appropriate mixtures of $SiO_2$, $Al(PO_3)_3$ and $Al_2O_3$ contained within Pt crucibles. For compositions on the $Al(PO_3)_3$—$SiO_2$ join, it was observed that clear glasses can be formed with $SiO_2$ contents ranging from 7 to nearly 30 weight %. In addition, clear glasses can be formed over a similar range of $SiO_2$ concentrations, but with higher $Al_2O_3$ content up to about 35% and, thus, expected superior chemical durability. Physical property data including anneal point ($T_a$), strain point ($T_{str}$) and thermal expansion coefficient (CTE) for these glasses is provided in the following Table 2:

TABLE 2

| Code | % $Al_2O_3$ | % $P_2O_5$ | % $SiO_2$ | $T_a$ (° C.) | $T_{str}$ (° C.) | CTE 25–500° C. (×10⁻⁷/° C.) |
|---|---|---|---|---|---|---|
| 891 HHM | 17.9 | 74.7 | 7.4 | 757 | 709 | 59 |
| 891 HHN | 17.4 | 72.4 | 10.2 | 756 | 714 | 55 |
| 891 HHO | 16.8 | 70 | 13.2 | 755 | 707 | 56 |
| 891 HHP | 16.2 | 67.5 | 16.3 | 758 | 718 | 56 |
| 891 HHQ | 15.5 | 64.8 | 19.7 | 743 | 694 | 56 |
| 891 HHR | 14.8 | 61.9 | 23.3 | 741 | 697 | 55 |
| 891 HHS | 14.1 | 58.8 | 27.1 | 731 | 683 | 59 |
| 891 HLX | 18.6 | 64.9 | 16.5 | 725 | 679 | 55 |
| 891 HLY | 21.2 | 62.2 | 16.6 | 701 | 656 | 51 |
| 891 HLZ | 23.7 | 59.5 | 16.8 | 680 | 631 | 46 |
| 891 HMA | 20.4 | 66.2 | 13.4 | 721 | 678 | 51 |
| 891 HMC | 25.4 | 61 | 13.6 | — | — | — |
| 891 HOQ | 26 | 66.3 | 7.7 | — | — | — |
| 891 HOT | 25.1 | 70 | 4.9 | — | — | — |
| 891 HOW | 26.6 | 71 | 2.4 | — | — | — |

Figure 4:
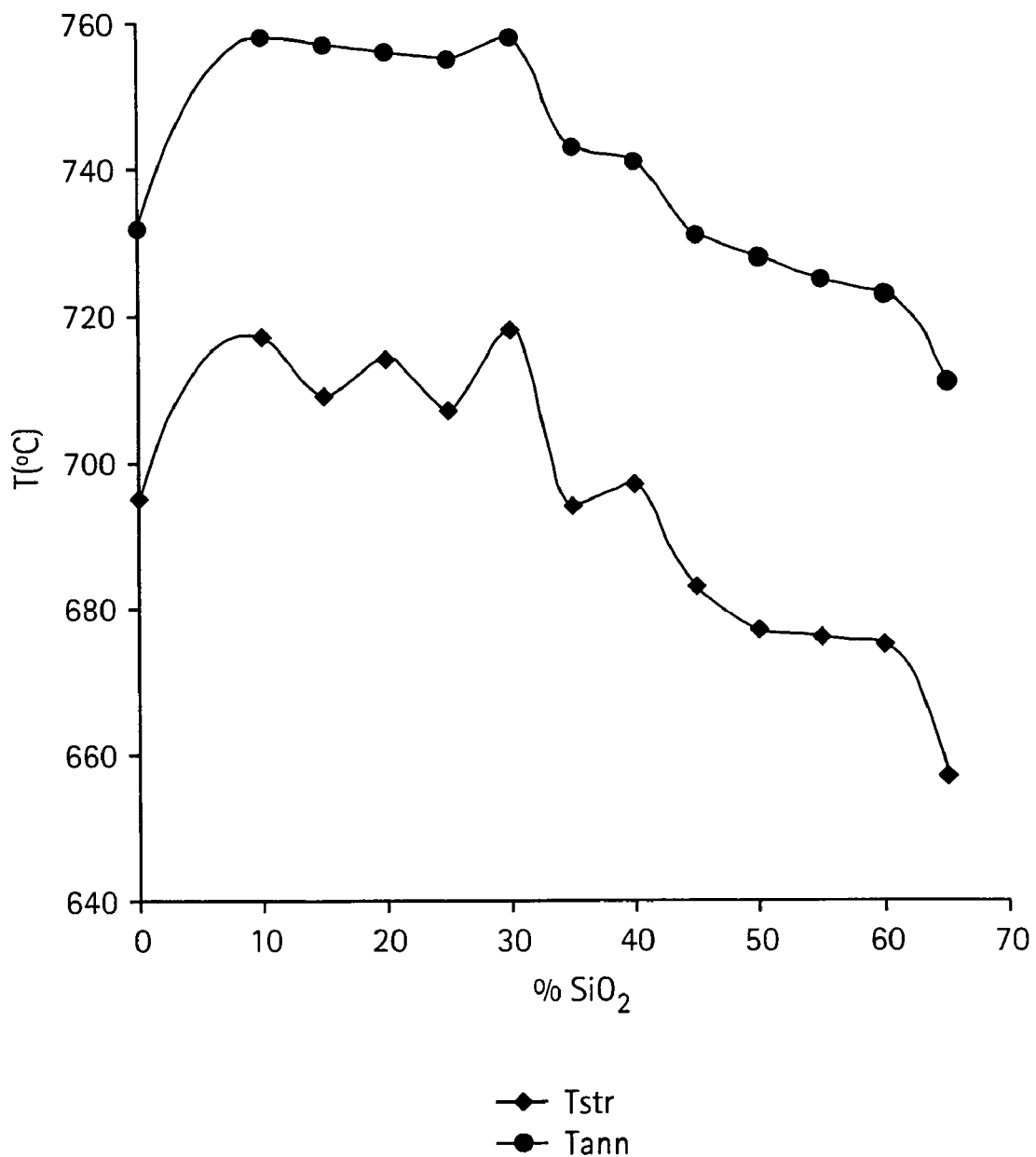
FIG. 4 is a plot demonstrating strain points and annealing points for glasses over a range of $SiO_2$ concentrations.

The data given above and displayed in FIG. 4 indicate that the highest strain points are achieved for glasses with (1) $Al_2O_3/P_2O_5$ ratios of ⅓ (i.e. lying on the on the $Al(PO_3)_3$—$SiO_2$ join and (2) $SiO_2$ contents of 7–18%, with glass 891

HHP being a preferred composition. The trend towards lower strain points at $SiO_2$ levels greater than 18% may be a reflection of the existence of a binary eutectic involving $SiO_2$ and $Al(PO_3)_3$ at some higher $SiO_2$ concentration. Similarly, the downward trend in strain point with increasing $Al_2O_3$ content at constant $SiO_2$ levels may be due to the existence of a thermal valley between the liquidus surfaces of $Al(PO_3)_3$ and $AlPO_4$.

As noted, any number of fluxes (modifying oxides) may be added to the batch in order to impart these and other desired characteristics. While these fluxes typically lower the strain point of the native glass, they are often necessary for any or all of the following purposes: raise the CTE, lower the liquidus temperature, obtain a preferred strain point for compaction, absorption at specific wavelengths, ease the melting, modify density or modify durability. The effects that certain oxides have on the physical and chemical characteristics of glass are generally known. Fluxes may be added in amounts up to 15%, or as limited by solubility. Fluxes are preferably added in amounts less than 10% in total. The glass compositions therefore are identified as:

| | |
|---|---|
| $SiO_2$ | 2–52 |
| $Al_2O_3$ | 8–35 |
| $P_2O_5$ | 30–75 |
| RO | 0–15 |

Modifying oxides may be selected from alkali metals, alkaline earth metals, transition metals as well as oxides of the lanthanide series. Specific examples include $Y_2O_3$, $ZrO_2$, $HfO_2$, MgO, CaO, SrO, BaO, $As_2O_3$, $SnO_2$, $Li_2O$ $La_2O_3$ $GeO_2$, $Ga_2O_3$, $Sb_2O_3$, $Na_2O$, $K_2O$, $Rb_2O$, $Cs_2O$, BeO, $Sc_2O_3$, $TiO_2$, $Nb_2O_5$, $Ta_2O_5$, ZnO, CdO, PbO, $Bi_2O_3$, $Gd_2O_3$, $Lu_2O_3$ and/or $B_2O_3$. As demonstrated, several examples of representative glasses were melted containing various fluxes. Therefore, for purposes of this invention, R shall be Mg, Ca, Y, Sr, Zr, Hf, As, Sn, Li, La, Ge, Ga, Sb, Ba, Sb, Ti, Ta, Zn, or any other element that fits the definition of the appropriate modifiers above.

luminosilicate glasses presently in commercial use. They also provide the benefit of having lower viscosities at 1600° C., allowing them to be self-fining. It is believed that the partial volatization of the $P_2O_5$ (in amounts approximating 1%) aid in refining of the glass. As a consequence, arsenic or other common fining agents will likely not be required during the manufacturing process.

We claim:

1. A substrate for a flat panel display device comprising the following composition when calculated in weight percent and calculated from the batch on an oxide basis: $P_2O_5$ 30 70, $SiO_2$ 21.4–52, $Al_2O_3$ 8–35 wherein said substrate is free of alkali metal.

2. The substrate of claim 1 wherein said substrate composition has a P/Al atomic ratio of between 1.3 and 4.0.

3. The substrate of claim 1 having a linear coefficient of thermal expansion of $25–55\times10^{-7}/°$ C. over a temperature range of 25 to 500° C.

4. The substrate of claim 1 having a strain point greater than 600° C.

5. The substrate of claim 1 having a strain point of at least 650° C.

6. The substrate of claim 1 having a strain point of at least 700° C.

7. An aluminum silicophosphate glass exhibiting a density less than about 2.5 $g/cm^3$, a strain point greater than approximately 650° C., the glass comprising the following composition as calculated in a weight percent on an oxide basis: 21.4–52 $SiO_2$, 8–35 $Al_2O_3$, and 30 70 $P_2O_5$ wherein said glass is free of alkali metal.

8. The glass composition of claim 7 further comprising at least one modifying oxide as calculated in weight percent on an oxide basis of less than 15%.

9. The glass composition of claim 8 wherein the modifying oxide is selected from the group consisting of CaO, $La_2O_3$, MgO, SrO, $Sb_2O_5$, BaO, $Y_2O_3$, $ZrO_2$, and $B_2O_3$ in a total amount not exceeding 10 weight %.

TABLE 3

| wt % | ZHR | ZIR | ZIT | ZIU | ZIV | ZIW | ZIX | ZIY | ZKH | ZJB |
|---|---|---|---|---|---|---|---|---|---|---|
| $SiO_2$ | 23.2 | 22.3 | 22.8 | 22.0 | 22.9 | 22.4 | 22.6 | 22.1 | 21.3 | 25.9 |
| $Al_2O_3$ | 15.1 | 14.5 | 14.9 | 14.4 | 14.9 | 14.6 | 14.7 | 14.4 | 13.9 | 12.4 |
| $P_2O_5$ | 56.9 | 54.6 | 55.8 | 53.9 | 56.1 | 54.9 | 55.3 | 54.1 | 52.2 | 51.6 |
| $B_2O_3$ | 4.8 | 4.6 | 4.7 | 4.5 | 4.7 | 4.6 | 4.6 | 4.5 | 4.4 | 4.5 |
| $ZrO_2$ | | 4.0 | | | | | | | 3.8 | |
| CaO | | | 1.9 | | | | | | | |
| $La_2O_3$ | | | | 5.2 | | | | | | |
| MgO | | | | | 1.3 | | | | | |
| SrO | | | | | | 3.4 | | | | |
| ZnO | | | | | | | 2.7 | | | 4.8 |
| $SnO_2$ | | | | | | | | 4.9 | | |
| $Y_2O_3$ | | | | | | | | | 8.7 | |
| $Sb_2O_5$ | | | | | | | | | | 0.9 |
| Liq T ° C. | 990 | | | | | | | ~1240 | | |
| Density | 2.470 | | | | | | | | | |
| CTE | 51 | 47 | | | | | 50 | 51 | | |
| Anneal | 736 | 738 | | | | | 705 | 724 | 727 | |
| Strain | 686 | 685 | | | | | 654 | 675 | 670 | |

As can readily be appreciated by the disclosed experimental data, the disclosed glass compositions present excellent candidates for display applications. They have strain points that are slightly higher than the alkaline earth boroa- 10. The glass of claim 7 further exhibiting a coefficient of thermal expansion of $25–55\times10^{-7}/°$ C. over a temperature range of 25 to 500° C.

* * * * *

UNITED STATES PATENT AND TRADEMARK OFFICE
CERTIFICATE OF CORRECTION

PATENT NO.         : 7,189,672 B2                                    Page 1 of 1
APPLICATION NO. : 11/026364
DATED              : March 13, 2007
INVENTOR(S)       : Bruce Gardiner Aitken et al.

It is certified that error appears in the above-identified patent and that said Letters Patent is hereby corrected as shown below:

| Col. | Line | Description |
|---|---|---|
| 8 | 13 | Reads: and calculated from the batch on an oxide basis: $P_2O_5 30$ 70; Should Read: and calculated from the batch on an oxide basis: $P_2O_5 30-70$ |
| 8 | 32 | Reads: 21.4-52 $SiO_2$, 8-35 $Al_2O_3$, and 30 70 $P_2O_5$ wherein said; Should Read: 21.4-52 $SiO_2$, 8-35 $Al_2O_3$, and 30-70 $P_2O_5$ wherein said |

Signed and Sealed this

Twenty-second Day of May, 2007

JON W. DUDAS
*Director of the United States Patent and Trademark Office*